US012645498B2

(12) United States Patent
Biran et al.

(10) Patent No.: US 12,645,498 B2
(45) Date of Patent: Jun. 2, 2026

(54) ESTABLISHING COHERENT MESSAGE ANALYSIS ACROSS DISTRIBUTED LOCATIONS

(71) Applicant: International Business Machines Corporation, Armonk, NY (US)

(72) Inventors: Giora Biran, Zichron-Yaakov (IL); Amit Shay, Kfar Saba (IL); Avraham Ayzenfeld, Hod Hasharon (IL)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 17/682,996

(22) Filed: Feb. 28, 2022

(65) Prior Publication Data

US 2023/0273824 A1 Aug. 31, 2023

(51) Int. Cl.
G06F 9/50 (2006.01)

(52) U.S. Cl.
CPC .... G06F 9/5022 (2013.01); G06F 2209/5011 (2013.01); G06F 2209/503 (2013.01)

(58) Field of Classification Search
CPC ................... G06F 2209/5011; G06F 2209/503
USPC ........................................................ 718/104
See application file for complete search history.

(56) References Cited

U.S. PATENT DOCUMENTS

| | | | |
|---|---|---|---|
| 7,523,130 B1 * | 4/2009 | Meadway | G06F 16/27 |
| | | | 707/999.102 |
| 7,599,293 B1 | 10/2009 | Bain et al. | |

| | | | |
|---|---|---|---|
| 8,433,786 B2 | 4/2013 | Agrawal et al. | |
| 8,473,925 B2 | 6/2013 | Gagliardi et al. | |
| 8,839,041 B2 | 9/2014 | Zakonov et al. | |
| 9,262,160 B2 | 2/2016 | Heil et al. | |
| 9,916,232 B2 | 3/2018 | Voccio et al. | |
| 11,537,568 B1 * | 12/2022 | Jayakumar | G06F 16/24535 |
| 2005/0192921 A1 * | 9/2005 | Chaudhuri | G06F 16/2358 |
| 2008/0016033 A1 * | 1/2008 | Forstmann | G06F 16/245 |
| 2009/0192982 A1 * | 7/2009 | Samuelson | G06F 16/2264 |
| 2009/0276419 A1 * | 11/2009 | Jones | G06F 16/332 |
| | | | 707/999.005 |
| 2011/0040771 A1 * | 2/2011 | Gilyadov | G06F 13/385 |
| | | | 707/754 |

(Continued)

FOREIGN PATENT DOCUMENTS

| | | |
|---|---|---|
| CN | 111586057 A | 8/2020 |

*Primary Examiner* — Pierre Vital
*Assistant Examiner* — Jordan Scott Motter
(74) *Attorney, Agent, or Firm* — Robert D. Bean

(57) ABSTRACT

A computer-implemented method, according to one approach, is for establishing coherent analysis across distributed locations. The computer-implemented method includes: processing messages at an initiator location. In response to detecting a query indicator set on one of the messages: an inspection resource is allocated from a pool of available inspection resources to collect initial information associated with the processing of the message having the set query indicator. Moreover, the message is sent to a receiver location with the set query indicator for processing and collecting supplemental information associated with the processing of the message at the receiver location. The initial and supplemental information is eventually collected, and the collected information is processed for determining performance characteristics of the processing of the message at the initiator and receiver locations.

20 Claims, 9 Drawing Sheets

(56) References Cited

U.S. PATENT DOCUMENTS

| | | | |
|---|---|---|---|
| 2012/0158693 A1* | 6/2012 | Papadimitriou | G06F 16/951 |
| | | | 707/E17.108 |
| 2016/0135178 A1* | 5/2016 | Mok | H04W 56/002 |
| | | | 455/450 |
| 2019/0243971 A1 | 8/2019 | Call et al. | |
| 2020/0334085 A1* | 10/2020 | Qiu | G06F 9/5016 |

* cited by examiner

300

508
or
514

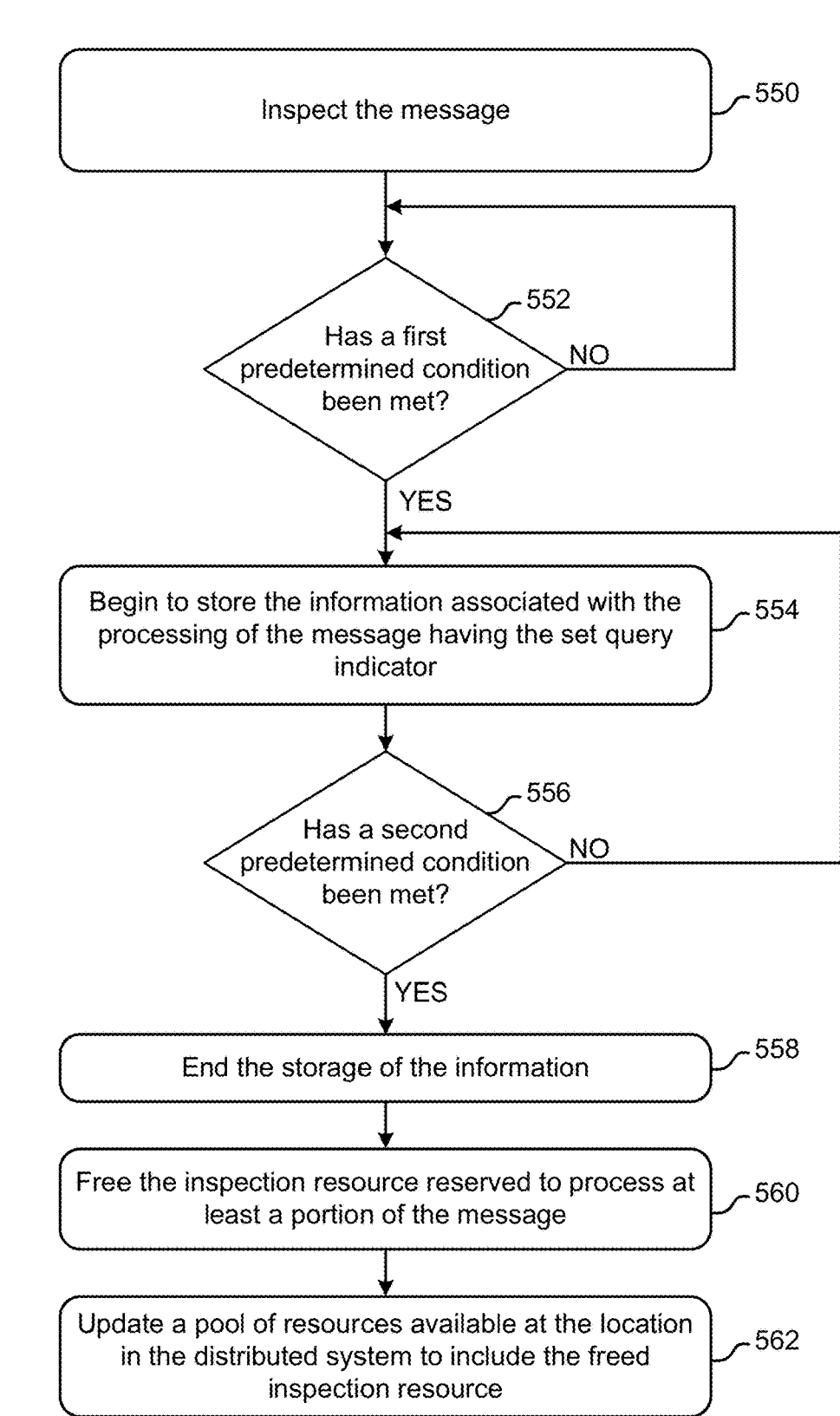

Inspect the message — 550

Has a first predetermined condition been met? — 552     NO

YES

Begin to store the information associated with the processing of the message having the set query indicator — 554

Has a second predetermined condition been met? — 556     NO

YES

End the storage of the information — 558

Free the inspection resource reserved to process at least a portion of the message — 560

Update a pool of resources available at the location in the distributed system to include the freed inspection resource — 562

FIG. 5B

ESTABLISHING COHERENT MESSAGE ANALYSIS ACROSS DISTRIBUTED LOCATIONS

BACKGROUND

The present invention relates to data processing, and more specifically, this invention relates to hardware transaction protocols.

Hardware-based transaction protocols typically involve using multiple different buffers, communication channels, queues, etc. These components may be positioned at different devices in some instances, thereby allowing the hardware transaction protocols to be implemented across more than one device and/or location. Moreover, these various components often have a shared logical interface that facilitates the transfer of information therebetween.

The time that is spent on each of the different stages of the protocols is able to provide insight as to the general performance thereof. It follows that collecting and inspecting data associated with satisfying a protocol may be able to resolve performance bottlenecks, at least to some extent.

However, as noted above, components used to implement hardware-based transaction protocols may be positioned at different devices and/or locations in some instances. It follows that depending on the transaction stage, a transaction may be executed at any of these devices and/or locations by the components corresponding thereto. As a result, conventional implementations have been plagued by a number of inefficiencies. For instance, the amount of processing power, network traffic, etc., that would be consumed by collecting all the information associated with every transaction performed is undesirably high and impractical. Therefore, performance instrumentation is collected on defined subset of the buffers and/or transactions. Moreover, the selection of the specific tractions that involve collecting instrumentation data is preconfigured and not controllable per transaction in these conventional instances.

These conventional implementations also lack any synchronization between the different devices and/or locations. As a result, these conventional implementations have simply been incapable of providing a coherent collection of data from the same transaction performed by different devices and/or at different locations.

It follows that in order to collect more substantial information on the transaction, instrumentation data should be collected at each end of the communication line extending between the devices and/or locations, and in the different stages on the transaction. However, this feat has been conventionally unachievable.

SUMMARY

A computer-implemented method, according to one approach, is for establishing coherent analysis across distributed locations. The computer-implemented method includes: processing messages at an initiator location. In response to detecting a query indicator set on one of the messages: an inspection resource is allocated from a pool of available inspection resources to collect initial information associated with the processing of the message having the set query indicator. Moreover, the message is sent to a receiver location with the set query indicator for processing and collecting supplemental information associated with the processing of the message at the receiver location. The initial and supplemental information is eventually collected, and the collected information is processed for determining performance characteristics of the processing of the message at the initiator and receiver locations.

By evaluating the initial and supplemental information, it can be determined how the message was actually processed. This evaluation may be able to identify any operational inefficiencies and provide data that is important in remedying any such inefficiencies. It follows that the information that is collected is able to be used to significantly improve system performance.

Some of the approaches herein are further able to successfully synchronize this collection of information between different devices and/or locations. For example, information (e.g., data, commands, requests functions, etc.) may be collected from an initiator location and a receiver location of a distributed system in a synchronized manner such that a coherent collection of information corresponding to the same transaction on both sides of the interface between the locations.

These improvements are achieved, at least in part, in some instances as a result of sending the information recorded (e.g., saved) at the initiator location to the receiver location with the message. More specifically, the fact that information is captured at the initiator location (e.g., source) and then transferred to the receiver location (e.g., target) to collect further information while operations are performed there, allows these approaches to achieve synchronized data capture across distributed systems in various implementations. In other words, by sharing packets of data between the two distributed locations, the information that is captured at each of the locations is assuredly correlated. In some instances, the message and the collected initial information may be sent to the receiver location using a peripheral component interconnect express (PCIe) function field to actually transfer the message and the collected initial information.

A computer program product, according to another approach, is for establishing coherent analysis across distributed locations. Moreover, the computer program product includes: one or more computer readable storage media, and program instructions collectively stored on the one or more computer readable storage media. The program instructions further include program instructions to perform the foregoing method.

A computer-implemented method, according to yet another approach, is for establishing coherent analysis across distributed locations. The computer-implemented method includes: receiving at a receiver location from an initiator location: a message having a set query indicator, and initial information collected at the initiator location, where the initial information is associated with the processing of the message at the initiator location. An inspection resource is allocated from a pool of available inspection resources to collect supplemental information associated with the processing of the message at the receiver location. The supplemental information is also correlated with the initial information. Furthermore, the collected supplemental information is sent to the initiator location.

As noted above, by collecting and providing the initial information along with the supplemental information, determinations as to how messages were actually processed can be made with improved accuracy. This evaluation may be able to identify any operational inefficiencies and provide data that is important in remedying any such inefficiencies. It follows that the information that is collected is able to be used to significantly improve system performance.

Moreover, by successfully synchronizing this collection of information between different devices and/or locations, performance is further improved. For example, information (e.g., data, commands, requests functions, etc.) may be collected from an initiator location and a receiver location of a distributed system in a synchronized manner such that a coherent collection of information corresponding to the same transaction on both sides of the interface between the locations.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 5B is a flowchart of sub-processes for one of the operations in the method of FIG. 5A, in accordance with one approach.

DETAILED DESCRIPTION

Figure 1:
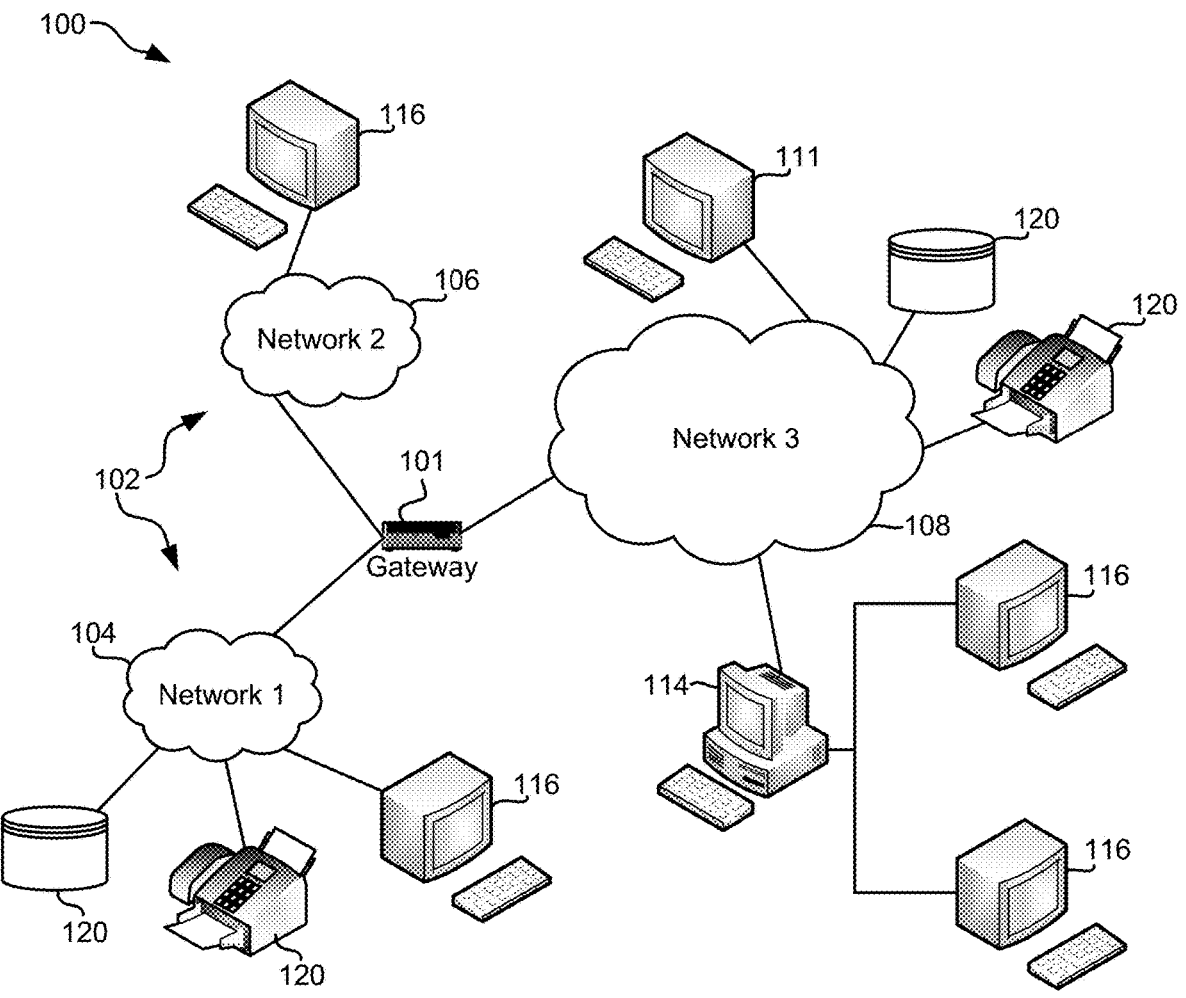
FIG. 1 is a diagram of a network architecture, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods, and computer program products for establishing coherent analysis across distributed locations. Various ones of the approaches included herein are desirably able to collect information for select ones of the actions that are being performed by components at different locations of a distributed system in a synchronized manner. By synchronizing the information collection across distributed locations, the approaches herein are able to achieve a coherent collection of information which has been conventionally unachievable in such distributed systems, e.g., as will be described in further detail below.

In one general approach, a computer-implemented method for establishing coherent analysis across distributed locations includes: processing messages at an initiator location. In response to detecting a query indicator set on one of the messages: an inspection resource is allocated from a pool of available inspection resources to collect initial information associated with the processing of the message having the set query indicator. Moreover, the message is sent to a receiver location with the set query indicator for processing and collecting supplemental information associated with the processing of the message at the receiver location. The initial and supplemental information is eventually collected, and the collected information is processed for determining performance characteristics of the processing of the message at the initiator and receiver locations.

In another general approach, a computer program product is for establishing coherent analysis across distributed locations. Moreover, the computer program product includes: one or more computer readable storage media, and program instructions collectively stored on the one or more computer readable storage media. The program instructions further include program instructions to perform the foregoing method.

In yet another general approach, a computer-implemented method for establishing coherent analysis across distributed locations includes: receiving at a receiver location from an initiator location: a message having a set query indicator, and initial information collected at the initiator location, where the initial information is associated with the processing of the message at the initiator location. An inspection resource is allocated from a pool of available inspection resources to collect supplemental information associated with the processing of the message at the receiver location. The supplemental information is also correlated with the initial information. Furthermore, the collected supplemental information is sent to the initiator location.

FIG. 1 illustrates an architecture 100, in accordance with one approach. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
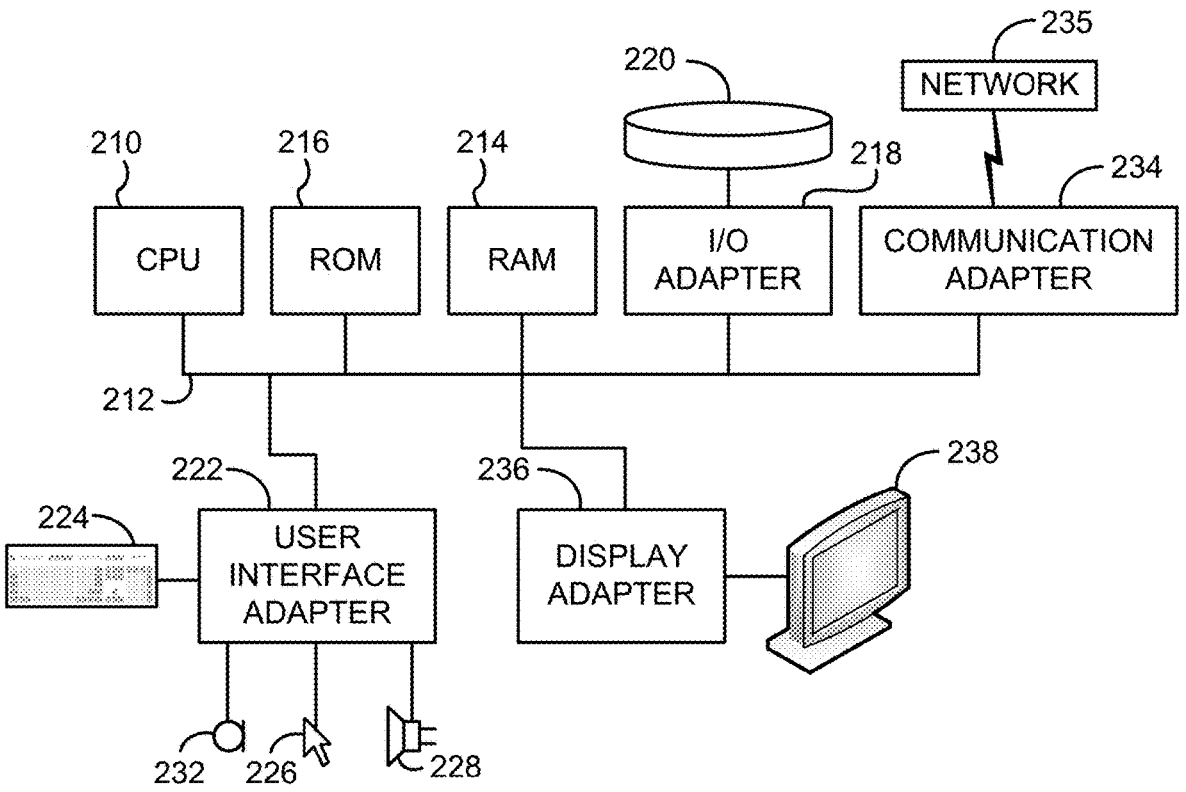
FIG. 2 is a diagram of a representative hardware environment that may be associated with the servers and/or clients of FIG. 1, in accordance with one approach.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred approach may also be implemented on platforms and operating systems other than those mentioned. A preferred approach may be written using eXtensible Markup Language (XML), C, and/or C++ language, or other programming languages, along with an object oriented programming methodology. Object oriented programming (OOP), which has become increasingly used to develop complex applications, may be used.

Figure 3:
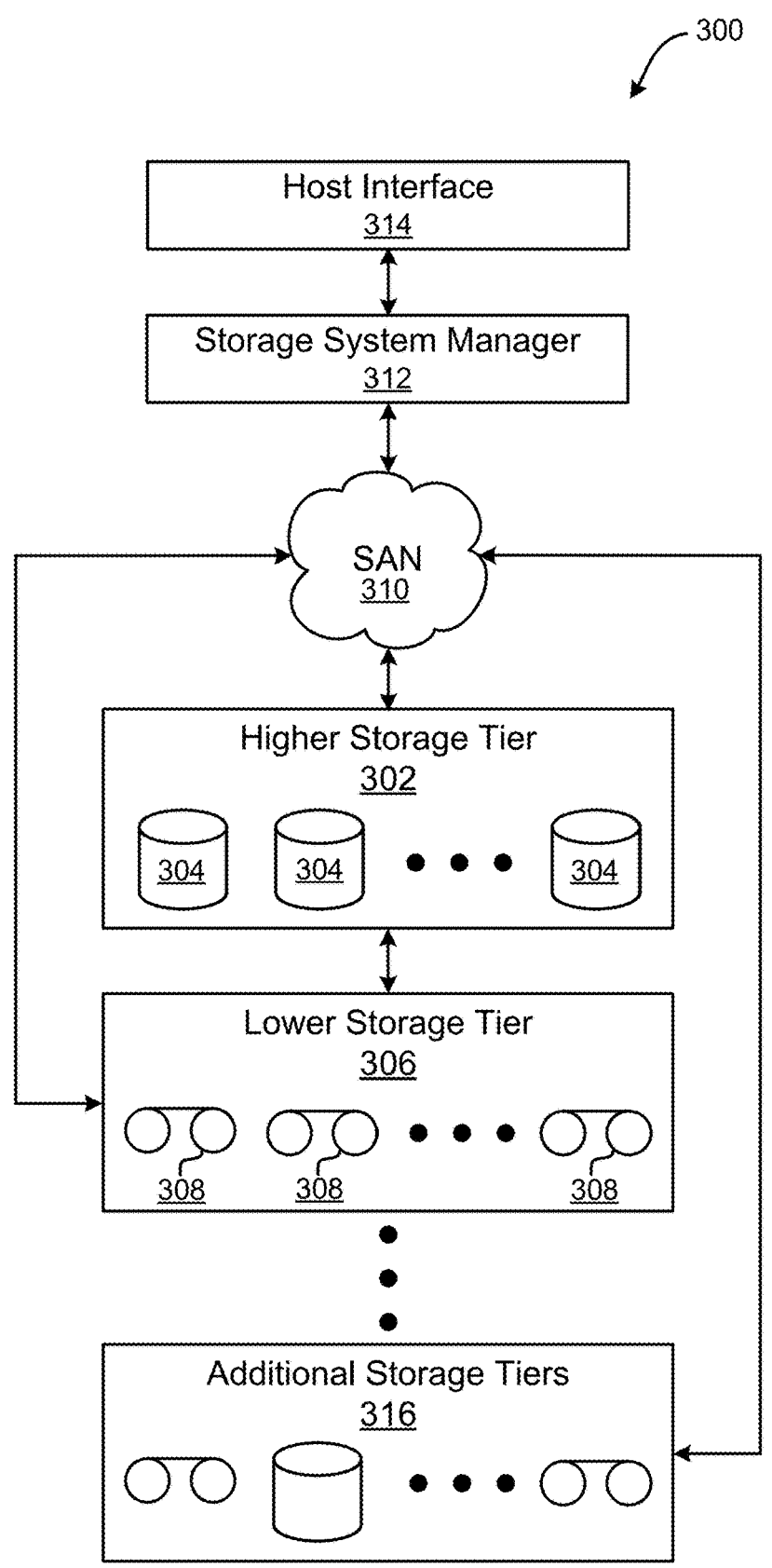
FIG. 3 is a diagram of a tiered data storage system, in accordance with one approach.

Now referring to FIG. 3, a storage system 300 is shown according to one approach. Note that some of the elements shown in FIG. 3 may be implemented as hardware and/or software, according to various approaches. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the approaches presented herein.

According to some approaches, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various approaches.

As previously mentioned, hardware-based transaction protocols typically involve using multiple different buffers, communication channels, queues, etc. These components may be positioned at different devices in some instances, thereby allowing the hardware transaction protocols to be implemented across more than one device which may be located at more than one location. Moreover, these various components often have a shared logical interface that facilitates the transfer of information therebetween.

Figure 4A:
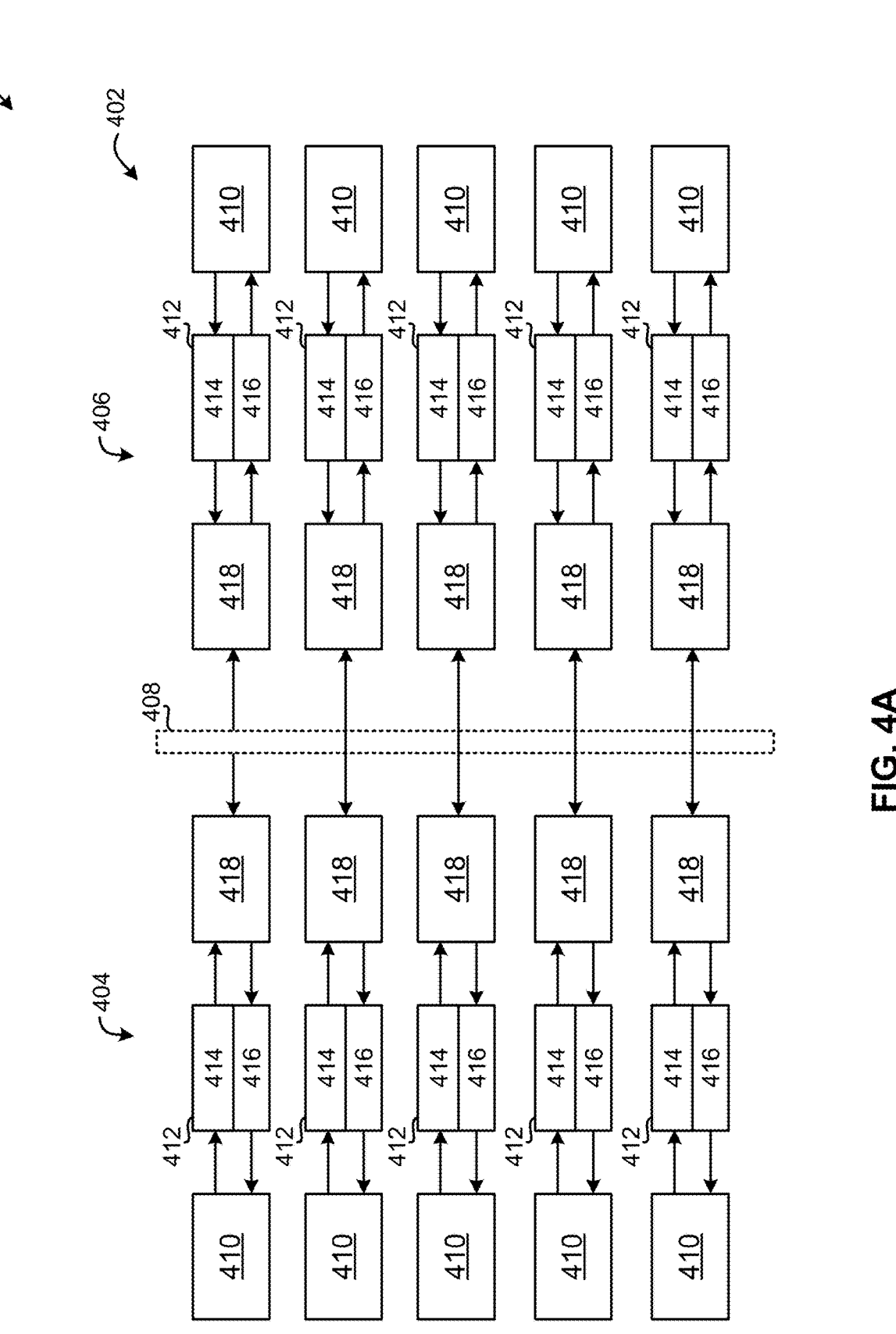
FIG. 4A is a partial logical representation of a distributed system, in accordance with one approach.
Figure 4B:
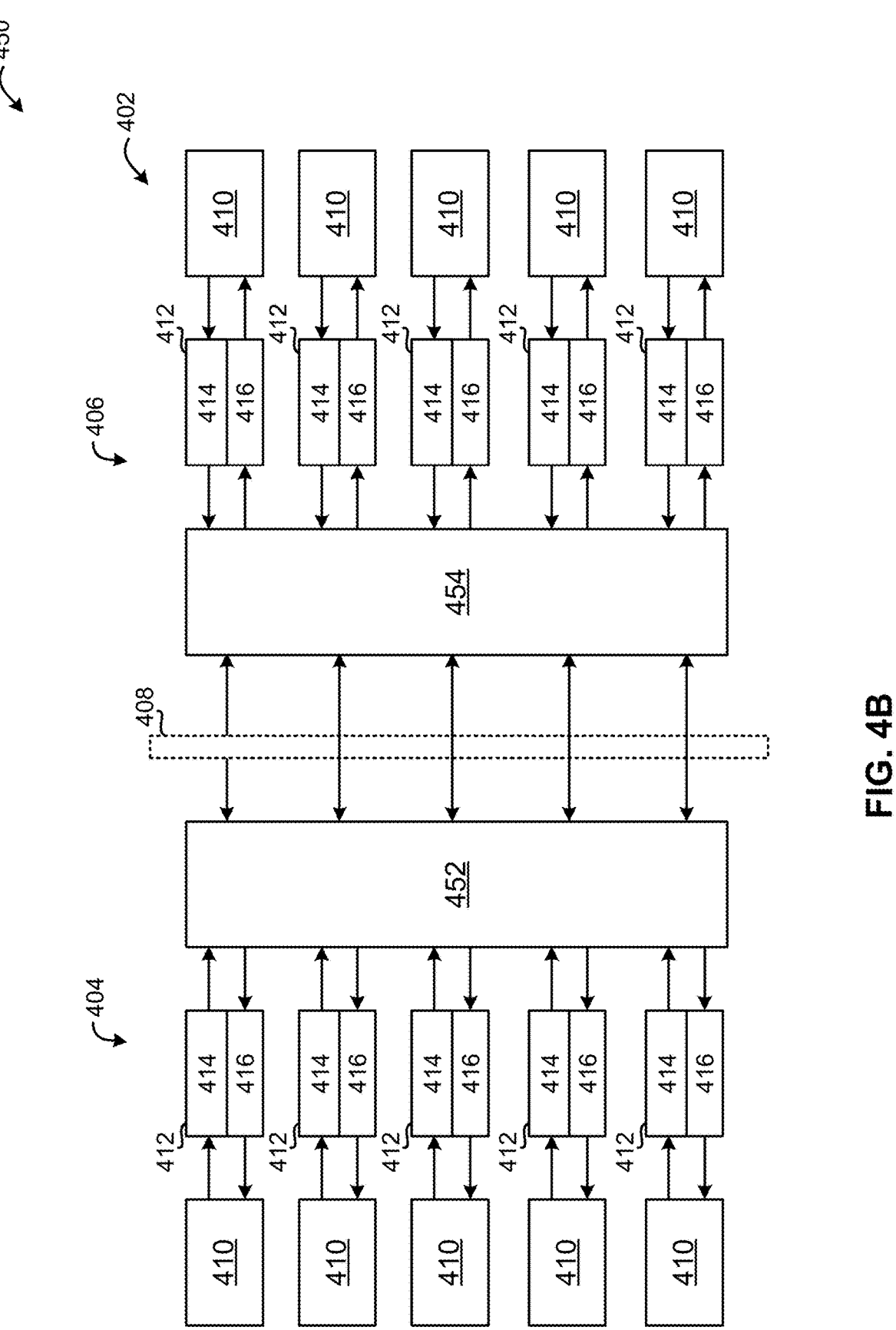
FIG. 4B is a partial physical representation of the distributed system, in accordance with one approach.

For instance, referring momentarily to FIGS. 4A-4B, representational views of the logical and physical configurations 400, 450 of a distributed system 402 having components positioned at two different locations are illustrated in accordance with one approach. As an option, either of the present configurations 400, 450 may be implemented in conjunction with features from any other approach listed herein, such as those described with reference to the other FIGS. However, such configurations 400, 450 and others presented herein may be used in various applications and/or in permutations which may or may not be specifically described in the illustrative approaches listed herein. Further, the configurations 400, 450 presented herein may be used in any desired environment. Thus FIG. 4A and/or FIG. 4B (and the other FIGS.) may be deemed to include any possible permutation.

Although the various components included in the distributed system 402 are depicted as being configured differently in the logical and physical configurations 400, 450, this has been done in order to highlight the differences between how information, commands, requests, functions, etc., flow logically compared to the physical connections that are actually used to perform the transfer. It should be noted that with respect to the present description, the term "information" may include data, metadata, transaction logs, etc., or any other desired type of information that may provide insight as to how the components (e.g., hardware modules 418) in the distributed system 402 are performing over time. Moreover, the components themselves may be used to satisfy different hardware transaction protocols, control messages, transactions having one or more packets therein, etc., and by doing so, create performance-based information, e.g., as will be described in further detail below.

The distributed system 402 is also depicted as having various components at two different locations that are connected to each other over an interface. Specifically, both configurations 400, 450 include an initiator 404 at an initiator location and a receiver 406 at a receiver location, which are able to communicate with each other. In other words, components included at each of the locations 404, 406 may be able to communicate with each other (e.g., send information, commands, requests, etc., therebetween) over an interface 408. The initiator may include any component or combination of components described herein. Similarly, the receiver may include any component or combination of components described herein.

Depending on the approach, the interface 408 may be configured differently. For instance, in some approaches the interface 408 may be a wireless interface, whereby the initiator 404 and receiver 406 may be able to communicate using, e.g., WiFi, Bluetooth, a cellular network, a local network, etc. However, in other approaches the interface 408 may incorporate a wired connection, whereby the components at the initiator 404 and receiver 406 may be able to communicate using a physical connection, e.g., such as a cable, a fiber-optic link, a wire, etc. It should also be noted that any desired type of connection that facilitates communication between the components at the two locations which would be apparent to one skilled in the art after reading the present description may be implemented. It follows that in some approaches, the initiator location and the receiver location are geographically separated from each other by some distance, e.g., are in different rooms, are in different buildings, are in different counties, are in different states, etc.

Looking now to the logical configuration 400 of FIG. 4A specifically, a number of firmware modules 410 are positioned at both the initiator location 404 and the receiver location 406. Each of these firmware modules 410 are coupled to a respective transfer module 412 which includes both a sender interface 414 and a receiver interface 416. It follows that the firmware modules 410 are able to at least communicate with the remainder of the distributed system 402 by sending information, data, commands, requests, etc., using the sender interface 414. The firmware modules 410 are also able to receive information, data, commands, requests, etc., from the remainder of the distributed system 402 using the receiver interface 416. The transfer module 412 and/or the components included therein may be configured differently depending on the particular situation, but are preferably able to facilitate the transfer of information, data, commands, requests, etc., to and from the firmware modules 410 as well as hardware modules 418. As a result, the firmware modules 410 and the hardware modules 418 are able to communicate with each other through the respective transfer modules 412.

As shown, hardware modules 418 are coupled to the interface 408 in addition to the transfer modules 412. As noted above, information, commands, requests, functions, etc., may be exchanged between the firmware modules 410 and hardware modules 418. The hardware modules 418 being coupled to the interface 408 thereby allows for any such information, commands, requests, functions, etc., to be sent from the firmware modules 410 at the initiator location 404 to components included at the receiver location 406. Accordingly, the information, commands, requests, functions, etc., may be directed to any of the specific components at the receiver location 406, e.g., such as the firmware modules 410 at the receiver location 406.

Looking to the receiver location 406 now specifically, it is noted that the components included therein are depicted as having a similar configuration to those at the initiator location 404, and therefore have common numbering. For instance, the receiver location 406 includes hardware modules 418, each of which is coupled to a respective transfer module 412, which in-turn includes a sender interface 414 as well as a receiver interface 416. The transfer modules 412 are also coupled to firmware modules 410 such that information may be transferred between the firmware modules 410 at the receiver location 406, and any of the other components included in the distributed system 402, e.g., such as the firmware modules 410 at the initiator location 404.

While the logical configuration 400 of FIG. 4A depicts certain configurations of the components included therein, this may not be reflected in how the various components are physically configured. For instance, each of the transfer modules 412 are illustrated in the logical configuration 400 of FIG. 4A as being coupled to a respective hardware module 418. However, looking to the physical configuration 450 of FIG. 4B, it is noted that the hardware modules are configured differently. Specifically, the transfer modules 412 at the initiator location 404 are configured to communicate with a same hardware module 452, while the transfer modules 412 at the receiver location 406 are configured to communicate with a same hardware module 454. However, it should be noted that while each of the hardware modules 452, 454 are illustrated as being a single object, they may include any number of components therein. For instance, depending on the desired approach, either of the hardware modules 452, 454 may include various channels, buffers, queues, etc., or any other types of components which would be apparent to one skilled in the art after reading the present description.

It follows that the distributed system 402 is able to facilitate communication between the components included at the initiator location 404 and the receiver location 406, even in situations where the two locations are geographically separated from each other. In other words, information, commands, requests, functions, etc. may be sent between the initiator location 404 and the receiver location 406.

While distributed systems having different locations may be desirable in terms of data retention, failover capabilities, etc., they have conventionally been subject to a number of limitations and inefficiencies when attempting to perform certain transactions. For instance, in situations involving a hardware transaction protocol being performed by a distributed system, the time that is spent on each of the different stages of the protocol is able to provide insight as to the general performance of the system. It follows that collecting and inspecting information associated with satisfying a protocol may be able to resolve performance bottlenecks, at least to some extent. However, the process of collecting the information is highly taxing in terms of system (e.g., hardware) resources, thereby making it infeasible to collect information for all protocols that are implemented by the system.

While attempts have been made to overcome this shortcoming by causing the system to collect information for predetermined ones of the protocols that are implemented, the rigidity of this predetermined schedule excludes the possibility of any dynamic adjustments to the type, frequency, number, etc., of the protocols that are evaluated. Moreover, the selection of the specific tractions that involve collecting instrumentation information is preconfigured and not controllable per transaction in these conventional instances. Thus, these attempts have suffered from significant inefficiencies.

The attempts also lack any synchronization between different devices and/or locations. As a result, the devices and/or locations are simply incapable of providing a coherent collection of information from the same transaction. As a result, the attempts have suffered from the inefficiencies that result from being unable to collect information from different distributed locations in a coherent manner.

In sharp contrast to the conventional shortcomings described above, various ones of the approaches included herein are able to collect information for select ones of the actions that are being performed at the components at the different locations of the distributed system. As noted above, the components themselves may be used to satisfy different hardware transaction protocols, control messages, transactions having one or more packets therein, etc., and by doing so, create performance-based information. This allows for dynamic and focused inspection (e.g., evaluation) of the hardware transaction protocols based on a variety of factors, thereby resulting in various ones of the approaches included herein being able to develop a more accurate interpretation of the system's performance metrics.

These approaches are thereby able to significantly improve the operating efficiency of the system by making operating adjustments. Some of the approaches herein are further able to successfully synchronize this collection of information between different devices and/or locations. For example, information (e.g., data, commands, requests functions, etc.) may be collected from an initiator location and a receiver location of a distributed system in a synchronized manner such that a coherent collection of information corresponding to the same transaction on both sides of the interface between the locations.

These improvements are achieved, at least in part, as a result of sending the information recorded (e.g., saved) at an initiator location to a receiver location. More specifically, the fact that the information is captured at the initiator location (e.g., source) and then transferred to the receiver location (e.g., target) to collect further information while operations are performed there, allows these approaches to achieve synchronized data capture across distributed systems in various implementations. In other words, by sharing packets of data between the two distributed locations, the information that is captured at each of the locations is assuredly correlated.

Figure 5A:
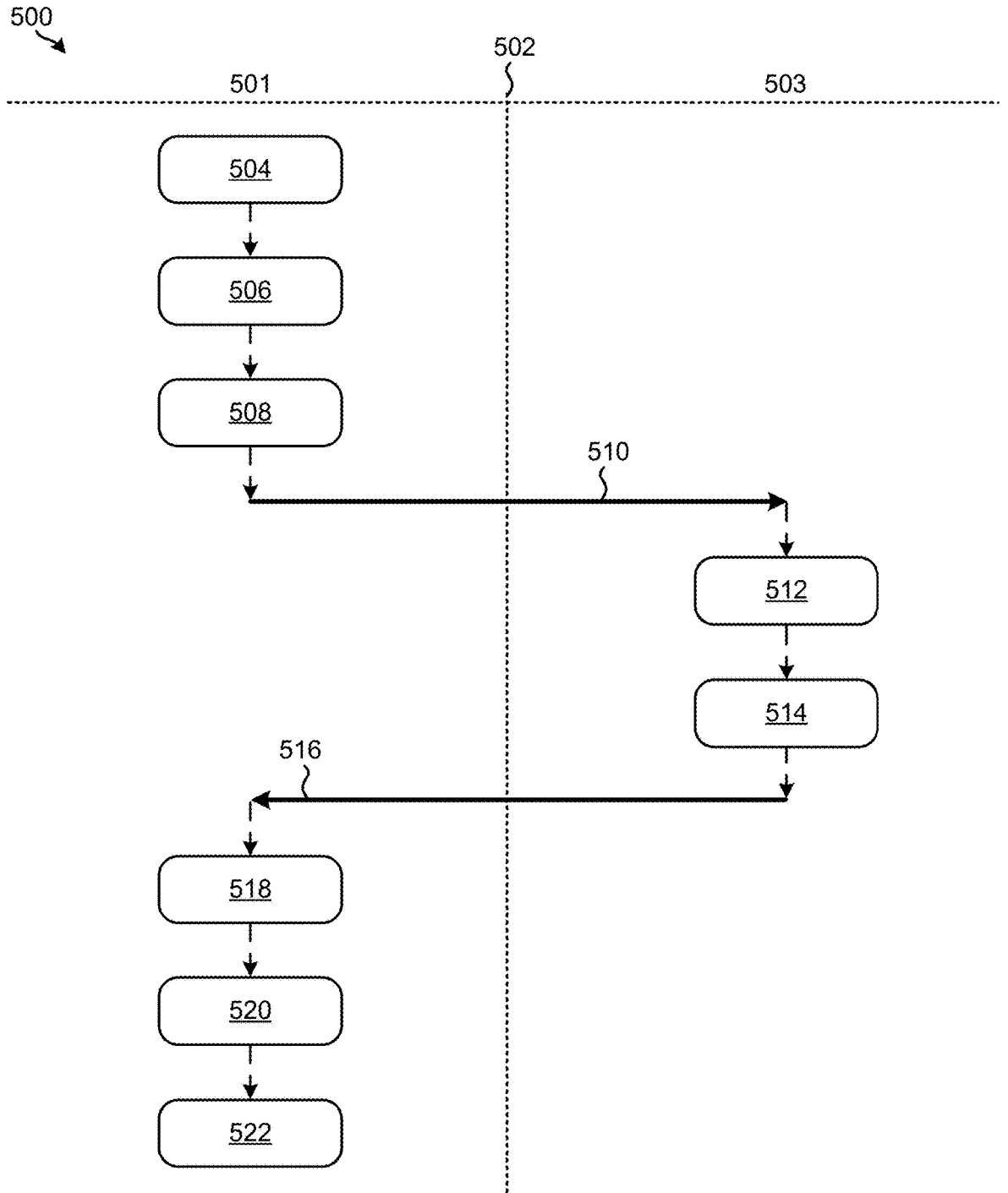
FIG. 5A is a flowchart of a method, in accordance with one approach.

Referring now to FIG. 5A, a flowchart of a computer-implemented method 500 for establishing coherent analysis across distributed locations is shown according to one approach. The method 500 may be performed in accordance with the present invention in any of the environments depicted in FIGS. 1-4B, among others, in various approaches. Of course, more or less operations than those specifically described in FIG. 5A may be included in method 500, as would be understood by one of skill in the art upon reading the present descriptions.

Each of the steps of the method 500 may be performed by any suitable component of the operating environment. For example, each of the nodes 501, 502, 503 shown in the flowchart of method 500 may correspond to one or more processors positioned at a different location in a multi-tiered data storage system. Moreover, each of the one or more processors are preferably configured to communicate with each other.

In various approaches, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 5A includes different nodes 501, 502, 503, each of which represent one or more processors, controllers, computer, etc., positioned at a different location in a distributed system (e.g., see 402 of FIGS. 4A-4B above). For instance, node 501 may include one or more processors which are located at (e.g., electrically coupled to) an initiator location of a distributed system (e.g., see initiator location 404 of FIGS. 4A-4B above). Node 503 may include one or more processors which are located at (e.g., electrically coupled to) a receiver location of a distributed system (e.g., see receiver location 406 of FIGS. 4A-4B above).

Furthermore, node 502 may include one or more processors which are incorporated at the interface between an initiator location and a receiver location, thereby assisting in the delivery of information, commands, etc. therebetween by being in communication with the one or more processors at each of nodes 501 and 503. Accordingly, commands, data, requests, etc. may be sent between each of the nodes 501, 502, 503 depending on the approach. Moreover, it should be noted that the various processes included in method 500 are in no way intended to be limiting, e.g., as would be appreciated by one skilled in the art after reading the present description. For instance, data sent from node 502 to node 503 may be prefaced by a request sent from node 503 to node 502 in some approaches.

As shown, operation 504 of method 500 includes processing messages at the initiator location. The messages may be received from any number of sources depending on the particular approach. For instance, the messages may be received from a user, a running application, another distributed system, in response to a predetermined event being met, etc. In a preferred approach, the message is created at the initiator location using any known technique. Moreover, the use of the term "message" is in no way intended to be limiting. Rather, the message may be any type of command, request, protocol, transaction having one or more packets, etc., that is intended to be implemented at the initiator location, e.g., by one or more of the components that are included at the initiator location.

The message may further involve performing one or more actions at different locations in a distributed system. As noted above, satisfying a request typically involve using multiple different buffers, communication channels, queues, etc. These components may be positioned at different devices in some instances, thereby allowing the request to be satisfied across more than one device and/or at more than one location. For instance, a first portion of the message may correspond to the initiator location, while a second (e.g., remaining) portion of the message may correspond to the receiver location.

It follows that processing the messages may involve at least inspecting each of the messages and determining what they involve performing. Processing the messages may also include determining whether each message includes a set query indicator. Query indicators may be used in some approaches to indicate that the information associated with processing of the message should be recorded, e.g., as will soon become apparent.

Again, some of the messages that are processed include a set query indicator in certain instances. Depending on the approach, the query indicator may be a single bit, more than one bit, a plurality of bits, etc. Moreover, the query indicator may be used to indicate which messages should be inspected and evaluated. For instance, a transaction may include various different packets, and the query indicator may be set on the transaction itself, thereby being applied to each of the packets included in that transaction. However, in other approaches, each of the packets themselves may include individual query indicators.

As noted above, conventional implementations have experienced inefficiencies caused by the inability to selectively collect information for desired ones of the actions that are performed. In contrast, the use of the query indicator in various ones of the approaches included herein enable a user, firmware, running applications, etc. to dynamically select which ones of the messages being satisfied in a distributed system are evaluated. Thus, in some approaches the message may be received with the query indicator already set, thereby indicating that processing the message should be inspected and evaluated.

However, in other approaches, the message may be generated or received and then assessed to determine whether the query indicator should be set, thereby indicating that processing the message should be inspected and evaluated. For instance, in a preferred approach, firmware and/or firmware modules in hardware at an initiator location (e.g., see 410 of FIGS. 4A-4B) may actually determine which of the messages should be evaluated to determine system performance metrics, e.g., by setting a query indicator on the message. This decision may be based on past operations and/or performance, current system settings, anticipated system performance, a backlog of unsatisfied messages, the type of messages received, etc. In other instances, the decision may be based on the initiator 404, a group of initiators 404, the type of operation defined by the message (e.g., a command only, a command and a data write, a command and a data read, etc.), destination firmware module 410, etc. It follows that the firmware may be able to selectively identify ones of the messages based on a variety of factors.

Although a query indicator is used in some approaches to selectively indicate which of the messages should be inspected and evaluated, it should be noted that this distinction may be made in any desired manner. For instance, messages may be identified for further inspection using metadata headers which may be used to store metadata that indicates whether each of the messages should be inspected.

Accordingly, a decision may be made as to whether each of the messages being processed includes a set query indicator. In response to determining that one of the messages does not include a set query indicator, the message may be processed without collecting any information associated therewith. In other words, the message lacking a set query indicator may be processed according to a default setting. However, in response to determining that one of the messages does include a set query indicator, information associated with the processing of the message having the set query indicator is desired.

Proceeding to operation 506, there method 500 includes allocating an inspection resource from a first pool of available inspection resources at the initiator location. Depending on the type of message, processing it at the initiator location may involve utilizing various types of components. Accordingly, the inspection resource reserved out of the first pool may effectively be set aside for a period of time, to be used to process at least a first portion of the message.

By reserving the inspection resource, the approaches herein are able to avoid resource conflicts and manage limited resources caused by attempting to use the same inspection resource to perform two different tasks, e.g., as would be appreciated by one skilled in the art after reading the present description. Moreover, the inspection resource may be reserved in any desired manner. For instance, in different approaches inspection resources may be reserved using a lookup table, one or more flags, etc., which indicate which of the resources are available (e.g., unused) and which are currently in-use.

However, in certain situations there may not be an adequate number of available (e.g., unused) inspection resources. In these situations, any messages having a set query indicator may be rejected from further inspection (e.g., information collection) and processed nominally (e.g., in a similar manner to messages that are received without having a set query indicator. In some approaches, a warning may be sent indicating that these messages were rejected from further inspection as a result of the lack of inspection resources.

Proceeding to operation 508, initial information associated with the processing of the message having the set query indicator is collected (e.g., recorded) using the allocated inspection resource at the initiator location. This initial information may actually be collected by the reserved inspection resource. Accordingly, the inspection resource may actually provide (e.g., send) the initial information before it is collected.

As noted above, the initial information that is actually collected may include data (written to, read from, rearranged in, etc., memory), metadata, transaction logs, etc., or any other desired type of information that may provide insight as to how the reserved inspection resource at the initiator location are performing over time. According to an example, which is in no way intended to be limiting, the information that is collected at the initiator and/or receiver locations may include the duration it takes to process any portion of the message, event counts, resource consumption, etc.

The initial information may also be collected and/or actually recorded between a predefined start point and a predefined stop point. In some approaches, the message may indicate the predefined start and stop points, while in other approaches the start and stop points may be set based on past performance, industry standards, user input and/or preferences, the type of message, etc. It follows that the initial information preferably begins to be collected in response to the start point being met. It should also be noted that the use of the term "point" is in no way intended to be limiting. Accordingly, the start and/or stop points may be actual clock values, correspond to certain conditions being met, direct input from a user or firmware, etc., depending on the approach.

Actually collecting the initial information may also be performed differently depending on the approach. For instance, in some approaches the initial information may be collected by simply writing a copy of the information in memory, while in other approaches the initial information may be identified in a lookup table, short-term memory (e.g., cache), etc.

Furthermore, operation 510 includes sending (e.g., transferring) message to the receiver location, and may also include sending the collected initial information to the receiver location. This transfer of the collected initial information and the message passes through the interface at node 502 before being delivered to the receiver location at node 503. According to an example, which is in no way intended to be limiting, the collected initial information and the message may be transferred to the receiver location by using a PCIe function field to actually transfer the collected initial information and the message, e.g., as would be appreciated by one skilled in the art after reading the present description.

In some instances, the message and initial information may actually be sent to the interface at node 502 along with one or more instructions for the interface to pass the message and initial information to the intended receiver location. It follows that the collected initial information and the associated message having a set query indicator are received at the receiver location from the initiator location through the interface.

In response to receiving the initial information and the associated message, the receiver location allocates an inspection resource out of a second pool of resources available at the receiver location. See operation 512. As noted above, depending on the type of message, processing it may involve utilizing various types of components. Accordingly, the inspection resource reserved out of the second pool may effectively be set aside for a period of time, to be used to collect supplemental information associated with the processing of the message at the receiver location. As noted above, in some instances a first portion of a message may correspond to a first location in a distributed system, while a second (e.g., remaining) portion of the message may correspond to a different location in the distributed system. The message may thereby be sent to both locations for the respective implementation and evaluation.

Again, by reserving the inspection resource, the approaches herein are able to avoid resources conflicts and manage limited resources caused by attempting to use the same resource to perform two different tasks, e.g., as would be appreciated by one skilled in the art after reading the present description. Moreover, the inspection resources may be reserved in any desired manner. For instance, in different approaches resources may be reserved using a lookup table, one or more flags, etc., which indicate which of the resources are available (e.g., unused) and which are currently in-use.

Proceeding to operation 514, supplemental information associated with processing of the message having the set query indicator is collected (e.g., recorded) using the allocated inspection resource at the receiver location. In some approaches, supplemental information for multiple different messages may actually be held in the hardware logic by the reserved inspection resource, and actually collected together at a later time. Accordingly, the inspection resource may be able to provide (e.g., send) the supplemental information before it is collected.

Similar to collecting the initial information, the supplemental information that is collected and eventually sent back to the initiator location may include data (written to, read from, rearranged in, etc., memory), metadata, transaction logs, etc., or any other desired type of information that may provide insight as to how the reserved resources at the receiver location performed. According to an example, which is in no way intended to be limiting, the information that is collected at the initiator and/or receiver locations may include the duration it takes to process any portion of the message, event counts, resource consumption, etc.

The receiver location may also receive one or more instructions, commands, requests, protocols, etc., that effectively cause the components included at the receiver location to perform certain operations. In other words, in some approaches the components at the initiator location may actually cause the supplemental information to be collected by the components at the receiver location. Having access to the initial information also desirably allows for the components at the receiver location to collect supplemental information in a manner that is synchronized with the initial information. By synchronizing the information collection at the two distributed locations, the approaches herein are able to achieve a coherent collection of information which has been conventionally unachievable in such distributed systems.

In other words, the synchronized collection of the information achieved by various ones of the approaches herein allows for the supplemental information to be directly correlated with the initial information. This direct correlation is the result of the fact that the initial information is sent to the receiver location along with the message. This further allows for greater operational efficiency, particularly in comparison to the conventional shortcomings alluded to above.

Like the initial information, the supplemental information may also be collected between a predefined start point and a predefined stop point. In some approaches, the message may indicate the predefined start and stop points, while in other approaches the start and stop points may be set based on past performance, industry standards, user input and/or preferences, the type of message, etc. It follows that the supplemental information preferably begins to be collected in response to the start point being met. It should also be noted that the use of the term "point" is in no way intended to be limiting. Accordingly, the start and/or stop points may be actual clock values, correspond to certain conditions being met, direct input from a user or firmware, etc., depending on the approach.

Actually collecting the information may also be performed differently depending on the approach. For instance, in some approaches the information may be collected by simply writing a copy of the information in memory, while in other approaches the information may be identified in a lookup table, held in short-term memory (e.g., cache), etc.

Furthermore, operation 516 includes transferring the collected supplemental information back to the receiver location. This transfer of the supplemental information, passes through the interface at node 502 before being delivered to the initiator location at node 501. According to an example, which is in no way intended to be limiting, supplemental information may be transferred from the receiver location back to the initiator location using a PCIe function field to actually achieve the transfer, e.g., as would be appreciated by one skilled in the art after reading the present description.

In some instances, the supplemental information may actually be sent to the interface at node 502 along with one or more instructions for the interface to pass it along to the intended initiator location. It follows that the collected supplemental information is received at the initiator location from the receiver location through the interface. It should also be noted that in some approaches, the message and/or the initial information initially sent to the receiver location may be sent back to the initiator location along with the supplemental information.

Operation 518 further includes collecting the initial and supplemental information, and combining it to form a complete representation of system performance while processing of the message at the initial and receiver locations. Such collection may be performed by the receiver location, by the initiator location, or a different computer. Again, this complete and synchronized copy of information allows for system performance to be assessed, and consequently, improved significantly. It should also be noted that while method 500 illustrates the initial information being combined with the supplemental information at the initiator location, this combination may be performed at the receiver location prior to sending the information back to the initiator location.

Looking to operation 520, the collected initial and supplemental information is processed in order to determine performance characteristics of the processing of the message at the initiator and receiver locations. In other words, operation 520 includes evaluating the initial and supplemental information to determine how the message was actually processed. This evaluation may be able to identify any operational inefficiencies and provide data that is crucial in remedying any such inefficiencies. It follows that the information collected as a result of performing method 500 is able to be used to significantly improve system performance. Moreover, the actions involved with remedying any inefficiencies as mentioned above may be implemented by a system administrator, suggested to a user, integrated in a running application, etc.

The initial and supplemental information may also be stored in memory. By storing this combined and synchronized information in memory, it may be accessed later for further system performance analysis and implementation. Moreover, from operation 520, method 500 proceeds to operation 522, whereby method 500 may end. However, it should be noted that although method 500 may end upon reaching operation 522, any one or more of the processes included in method 500 may be repeated in order to process additional messages or other types of requests. In other words, any one or more of the processes included in method 500 may be repeated for subsequently received requests.

As noted above, information may be collected (e.g., recorded) at the initiator location and/or the receiver location between predefined start and stop points. The collection of information may thereby be initiated and/or ended in response to predetermined conditions being met in some approaches. For instance, looking to FIG. 5B, exemplary sub-processes of collecting information associated with using one or more allocated inspection resources to collect initial information associated with the processing of the message are illustrated in accordance with one approach. It follows that one or more of the sub-processes illustrated in FIG. 5B may be used to perform operation 508 and/or operation 514 of FIG. 5A. However, it should be noted that the sub-processes of FIG. 5B are illustrated in accordance with one approach which is in no way intended to limit the invention.

As shown, sub-operation 550 includes inspecting the message. As noted above, in some instances the message may actually identify the start and stop times associated therewith. It follows that details pertaining to how and when information should be collected may be gleaned by inspecting the message.

Decision 552 further includes determining whether a first predetermined condition has been met. The first predetermined condition may effectively serve as an indication that information should start being saved. In other words, the first predetermined condition may effectively serve as a start point. In some approaches, the first predetermined condition may be a set start time that, when reached by an internal operating clock, signals to begin storing information associated with processing at least a portion of the message. Moreover, this determination may be based on any details gained from inspecting the message and/or any details associated with past performance, user inputs, preconfigured settings, the type of operations being performed, etc.

In response to determining that the first predetermined condition has not been met, the flowchart simply returns to decision 552 such that the determination may be made again. Although not illustrated in FIG. 5B, the flowchart may actually wait a predetermined amount of time or for an event to occur before reevaluating decision 552. It also follows that decision 552 may be repeated any number of times in an iterative loop before determining that the first predetermined condition has been met.

However, in response to determining that the first predetermined condition has been met, the flowchart advances from decision 552 to sub-operation 554. There, sub-operation 554 includes beginning to collect the information associated with the processing of the message having the set query indicator. Again, the first predetermined condition being met effectively serve as a start point for collecting the information at the respective location.

From sub-operation 554, the flowchart proceeds to decision 556 which includes determining whether a second predetermined condition has been met. While the first predetermined condition may effectively serve as an indication that information should start being collected, the second predetermined condition may serve as an indication to stop collecting information. In other words, the second predetermined condition may effectively serve as an ending point. In some approaches, the second predetermined condition may be a set end time that, when reached by an internal operating clock, signals to stop collecting information associated with processing at least a portion of the message. Moreover, this determination may be based on any details gained from inspecting the message and/or any details associated with past performance, user inputs, preconfigured settings, the type of operations being performed, etc.

In response to determining that the second predetermined condition has not been met, the flowchart simply returns to sub-operation 554 such that information may continue to be collected before returning to decision 556 where the determination may be made again. Although not illustrated in FIG. 5B, the flowchart may actually wait a predetermined amount of time or for an event to occur before reevaluating decision 552. It also follows that sub-processes 554, 556 may be repeated any number of times in an iterative loop before determining that the second predetermined condition has been met.

In response to determining that the second predetermined condition has been met, the flowchart proceeds from decision 556 to sub-operation 558. There, sub-operation 558 includes ending the storage of the information. In other words, sub-operation 558 stops the information associated with processing at least a portion of the message from being stored (e.g., saved in memory).

Moreover, sub-operation 560 includes freeing the inspection resource reserved to process the at least a portion of the message, while sub-operation 562 includes updating a pool of resources available at the respective location in the distributed system to include the freed inspection resource. As a result, the one or more freed resources are made available for use in processing (e.g., satisfying, evaluating, performing, etc.) further actions. In some approaches, a pool of resources may be updated by inspecting a lookup table, buffer, queue, etc., in order to determine whether any resources have been recently freed, and adding any resources back into the pool.

Again, various ones of the approaches included herein are desirably able to collect information for select ones of the actions that are being performed by the components at the different locations of a distributed system. As noted above, the components themselves may be used to process different hardware transaction protocols, messages, transactions having one or more packets therein, etc., and by doing so, create performance-based information. This allows for dynamic and focused inspection (e.g., evaluation) of the hardware transaction protocols based on a variety of factors, thereby resulting in various ones of the approaches included herein being able to develop a more accurate interpretation of the system's performance metrics. For example, the number of transactions having information associated therewith collected may be increased during desired periods of high performance, such that the additional information provides a more accurate representation of system performance.

These approaches are thereby able to significantly improve the operating efficiency of the system by making operating adjustments. Some of the approaches herein are further able to successfully synchronize this collection of information between different devices and/or locations. For example, information (e.g., data, commands, requests functions, etc.) may be collected from an initiator location and a receiver location of a distributed system in a synchronized manner such that a coherent collection of information corresponding to the same transaction on both sides of the interface between the locations.

These improvements are achieved, at least in part, as a result of sending the information recorded (e.g., collected) at an initiator location to a receiver location, and back to the initiator location. More specifically, the fact that the information is captured at the initiator location (e.g., source) and then transferred to the receiver location (e.g., target) to collect further information while operations are performed there, allows these approaches to achieve synchronized data capture across distributed systems in various implementations. In other words, by sharing packets of data between the two distributed locations, the information that is captured at each of the locations is desirably correlated.

Figure 6:
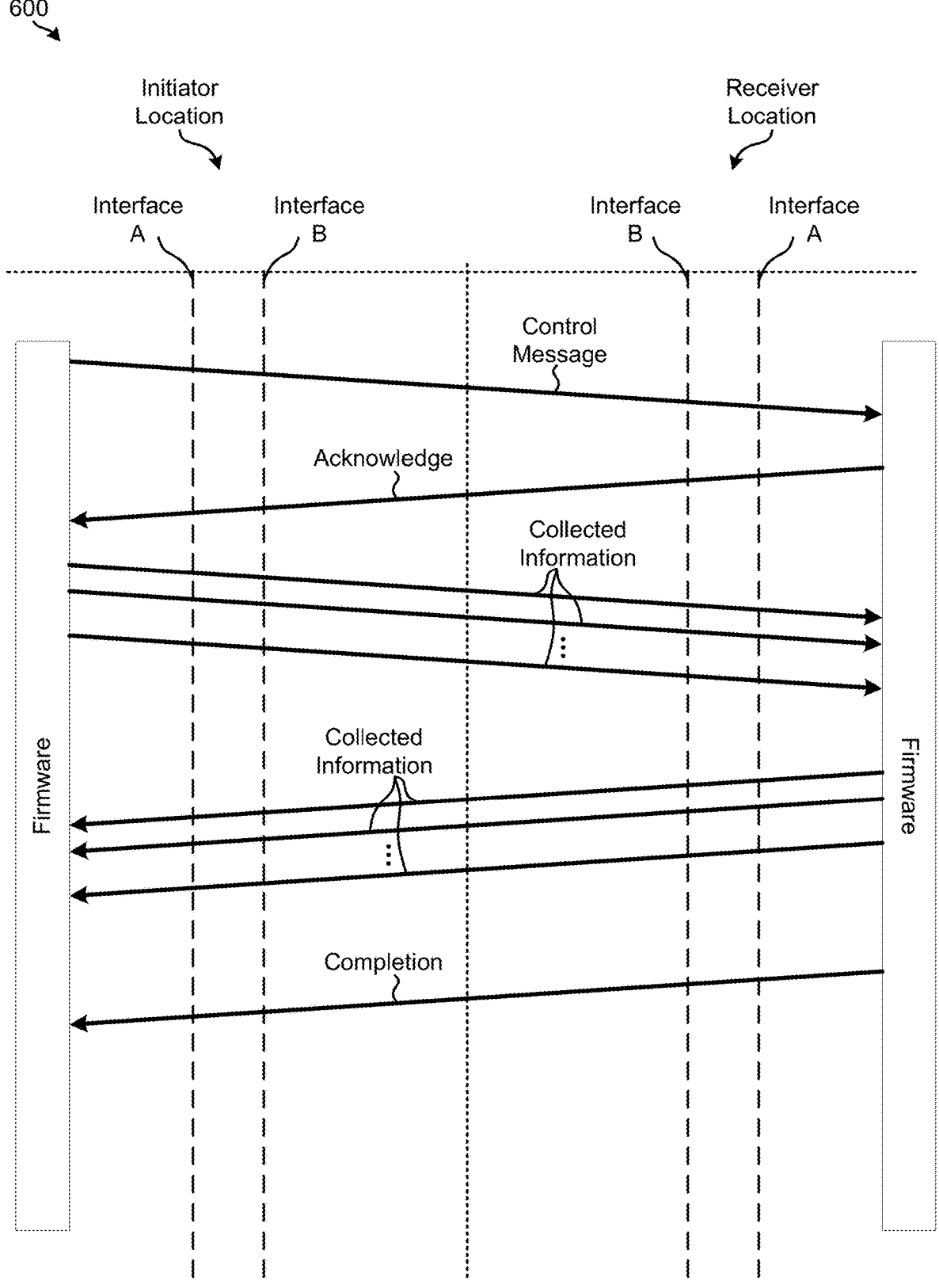
FIG. 6 is a graphical representation of the details that are sent between components included at an initiator location and at a receiver location of a distributed system, in accordance with one approach.

Looking to FIG. 6, a graphical representation 600 of the details that are sent between components at an initiator location and components at a receiver location of a distributed system is depicted in accordance with an in-use example which is in no way intended to limit the invention. As shown, a control message is sent from the firmware across Interface A and Interface B at the initiator location, arriving at the receiver location after passing across Interface B and Interface A. The control message may be sent to the receiver location in response to a first portion of the message being satisfied at the initiator location in some approaches.

In response to receiving the control message, the firmware at the receiver location returns an acknowledgement to the initiator location. Information collected at the initiator location while processing a first portion of the control message is sent to the receiver location after receiving the acknowledgement from the receiver location. It should be noted that depending on the approach, the control message may be sent prior to the information collected (e.g., as seen here in FIG. 6), along with the collected information, after the collected information has been transferred, etc.

In response to receiving the information collected at the initiator location in addition to the control message, components at the receiver location are used to process a remaining portion of the control message. Information is also preferably collected while the remaining portion of the control message is completed at the receiver location. This information collected at the receiver location is ultimately returned to the initiator location. A completion message is also returned to the initiator location to indicate that the transfer of information from the receiver location has completed, at which point the information collected at, and received from the receiver location may be combined with the information previously collected at the initiator location, thereby forming a complete set of information.

Figure 7:
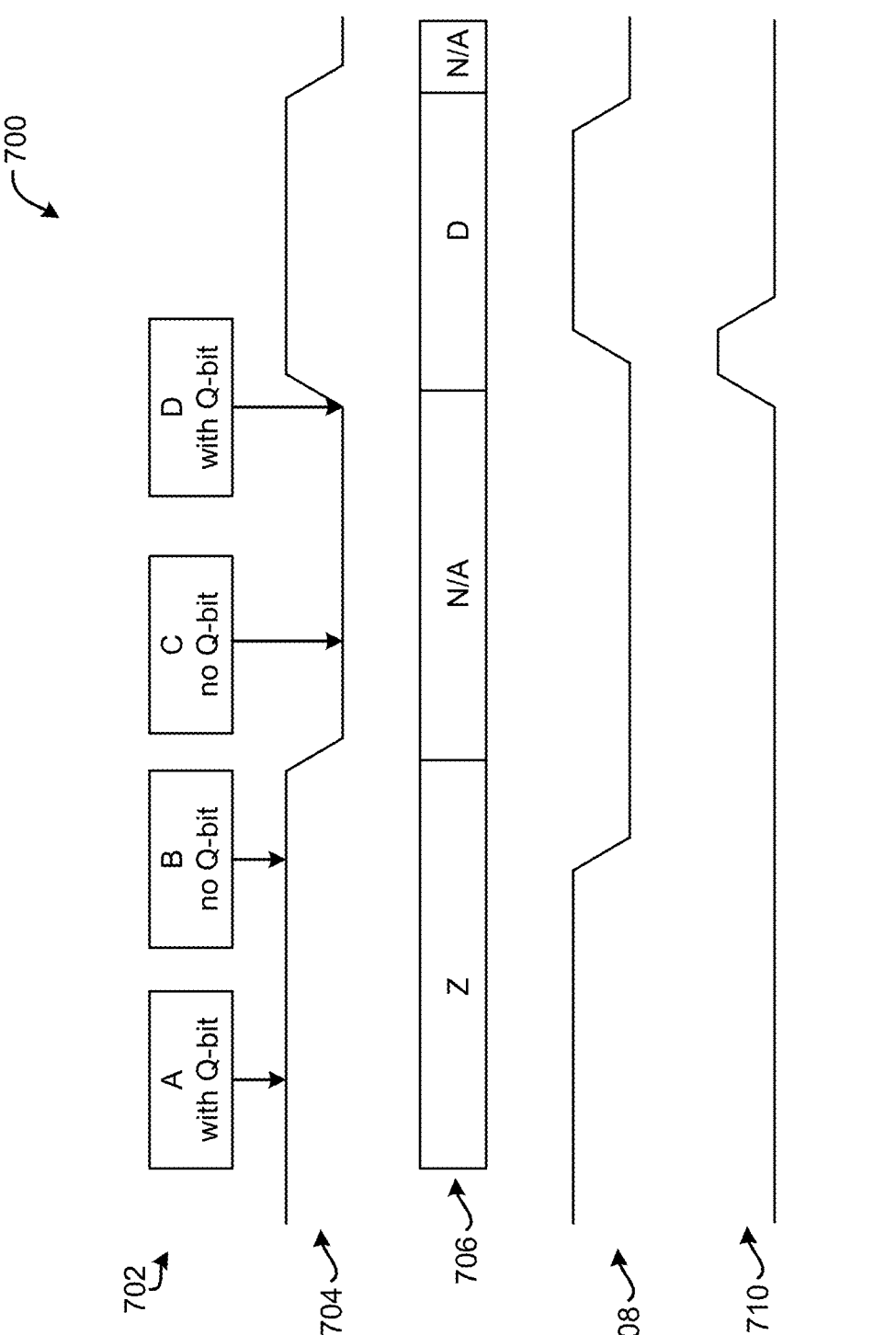
FIG. 7 is a logical representation of the process of starting and stopping the collection of information at a location in a distributed system, in accordance with one approach.

Referring momentarily now to FIG. 7, a logical representation 700 of the process of starting and stopping the collection of information at a location in a distributed system is depicted in accordance with an in-use example which is in no way intended to limit the invention. As shown, different PCIe transactions 702 having one or more packets therein are received at the location. As noted, each of the PCIe transactions 702 indicates whether a corresponding query indicator "Q bit" is set, thereby indicating whether the respective PCIe transaction 702 should be inspected, e.g., have information associated therewith stored.

The PCIe transactions 702 are mapped against a logical indication 704 of whether adequate resources at the given location are available for use, where a high value (e.g., state) indicates that the resources are currently in use, while a low value indicates that resources are available for use. The current transaction utilizing the resources at a given point is also represented. See graphical row 706. For instance, a left-most entry in the row 706 indicates that transaction "Z" is currently using the resources, thereby causing received transaction "A" to be denied as a result of not having enough available resources. Received transaction "B" is also not processed as it is not received with a set query indicator. However, when transaction "Z" ends, the resources are marked as being available "N/A".

The duration indication 708 further depicts the actual duration during which information associated with performing the present transaction is collected (e.g., copied and stored). Accordingly, the trailing edge of the plot in the duration indication 708 leads the trailing edge of the plot in the logical indication 704 of whether adequate resources at the given location are available for use, as it does take some time to free the resources after the transaction has completed.

Finally, the trigger indication 710 depicts the event that indicates when the information should begin to be captured. In other words, the trigger indication 710 depicts when a start point occurs, thereby causing a leading edge in the duration indication 708.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow-chart and/or block diagram block or blocks.

The flowchart and block diagrams in the Figures illustrate the architecture, functionality, and operation of possible implementations of systems, methods, and computer pro-gram products according to various embodiments of the present invention. In this regard, each block in the flowchart or block diagrams may represent a module, segment, or portion of instructions, which comprises one or more executable instructions for implementing the specified logi-cal function(s). In some alternative implementations, the functions noted in the blocks may occur out of the order noted in the Figures. For example, two blocks shown in succession may, in fact, be accomplished as one step, executed concurrently, substantially concurrently, in a par-tially or wholly temporally overlapping manner, or the blocks may sometimes be executed in the reverse order, depending upon the functionality involved. It will also be noted that each block of the block diagrams and/or flowchart illustration, and combinations of blocks in the block dia-grams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hard-ware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for establishing coherent analysis across distributed locations, comprising:
   processing messages at an initiator location;
   in response to detecting a query indicator set on one of the messages allocating an inspection resource from a pool of available inspection resources at the initiator loca-tion;
   using the inspection resource to:
   process a first portion of the one of the messages at the initiator location, and
   collect initial information produced as a result of pro-cessing the first portion of the one of the messages at the initiator location;
   sending, to a receiver location over a network, the initial information and the one of the messages with the set query indicator;
   causing the receiver location to process a remaining portion of the one of the messages at the receiver location and collect supplemental information pro-duced as a result of processing the remaining portion of the one of the messages at the receiver location;
   receiving the supplemental information from the receiver location;
   combining the supplemental information with the initial information; and
   processing the combined initial and supplemental infor-mation for determining performance characteristics of the processing of the one of the messages at the initiator location and the receiver location, respectively.

2. The computer-implemented method of claim 1, wherein the query indicator is set by firmware included in hardware that is located at the initiator location, wherein the one of the messages is a control message.

3. The computer-implemented method of claim 1, wherein collecting initial information associated with the processing of the one of the messages having the set query indicator includes:
   inspecting the one of the messages;
   in response to a first predetermined condition being met, beginning to collect the initial information associated with the processing of the one of the messages; and
   in response to a second predetermined condition being met, ending the collecting of the initial information.

4. The computer-implemented method of claim 3, com-prising:
   in response to ending the collecting of the initial infor-mation, freeing the inspection resource; and
   updating the pool of available inspection resources to include the freed inspection resource.

5. The computer-implemented method of claim 1, wherein the initial information that is collected at the initiator location includes durations and/or counts, wherein the initial information is sent to the receiver location with the one of the messages.

6. The computer-implemented method of claim 5, wherein the initial information includes a duration that the inspection resource took to process the one of the messages, wherein sending the one of the messages and the collected initial information to the receiver location includes using a peripheral component interconnect express (PCIe) function field to actually transfer the one of the messages and the collected initial information.

7. The computer-implemented method of claim 1, wherein the initiator location and the receiver location are geographically separated from each other.

8. A computer-implemented method for establishing coherent analysis across distributed locations, comprising:

receiving at a receiver location from an initiator location:

a message having a set query indicator, and initial information collected at the initiator location, wherein the initial information is produced as a result of processing a first portion of the message at the initiator location;

allocating an inspection resource from a pool of available inspection resources at the receiver location;

using the inspection resource to:

process a remaining portion of the message at the receiver location, and collect supplemental information produced as a result of processing the remaining portion of the message at the receiver location, wherein the supplemental information is correlated with the initial information; and sending the collected supplemental information to the initiator location.

9. The computer-implemented method of claim 8, wherein the query indicator is set by firmware included in hardware that is located at the initiator location, wherein the inspection resource processes the message at the receiver location while simultaneously collecting the supplemental information, wherein the message is a control message.

10. The computer-implemented method of claim 8, wherein using the inspection resource to process the remaining portion of the message at the receiver location and collect the supplemental information includes:

inspecting the message;

in response to a first predetermined condition being met, beginning to store in memory the supplemental information associated with the processing of the remaining portion of the message; and in response to a second predetermined condition being met, ending the collecting of the supplemental information.

11. The computer-implemented method of claim 10, comprising:

in response to ending the collecting of the supplemental information, freeing the inspection resource; and updating the pool of available inspection resources to include the freed inspection resource.

12. The computer-implemented method of claim 8, wherein the supplemental information that is collected at the receiver location includes durations and/or counts, wherein the received initial information is not sent back to the initiator location.

13. The computer-implemented method of claim 12, wherein the supplemental information is collected between a predefined start point and a predefined stop point, wherein the initial information includes a duration that an inspection resource at the initiator location took to process the message, wherein the supplemental information includes a duration that the inspection resource at the receiver location took to process the message.

14. The computer-implemented method of claim 8, wherein receiving the message and the collected initial information includes receiving a peripheral component interconnect express (PCIe) function field which actually transfers the message and the collected initial information.

15. The computer-implemented method of claim 8, wherein the initiator location and the receiver location are geographically separated from each other.

16. A computer program product for establishing coherent analysis across distributed locations, the computer program product comprising:

one or more computer readable storage media, and program instructions stored on the one or more storage media to perform operations comprising:

processing messages at an initiator location;

in response to detecting a query indicator set on one of the messages, allocating an inspection resource from a pool of available inspection resources at the initiator location;

using the inspection resource to:

process a first portion of the one of the messages at the initiator location, and collect initial information produced as a result of processing the first portion of the one of the messages at the initiator location;

sending, to a receiver location, the initial information and the one of the messages with the set query indicator;

causing the receiver location to process a remaining portion of the one of the messages at the receiver location and collect supplemental information produced as a result of processing the remaining portion of the one of the messages at the receiver location;

receiving the supplemental information from the receiver location;

combining the supplemental information with the initial information; and process the combined initial and supplemental information for determining performance characteristics of the processing of the one of the messages at the initiator location and the receiver location, respectively.

17. The computer program product of claim 16, wherein collecting initial information associated with the processing of the one of the messages having the set query indicator includes:

inspecting the one of the messages;

in response to a first predetermined condition being met, beginning to collect the supplemental information associated with the processing of the one of the messages;

in response to a second predetermined condition being met, ending the collecting of the supplemental information;

in response to ending the collecting of the supplemental information, freeing the inspection resource; and updating the pool of available inspection resources to include the freed inspection resource.

18. The computer program product of claim 16, wherein the query indicator is set by firmware included in hardware that is located at the initiator location, wherein the initial information includes a duration that the inspection resource took to process the one of the messages at the initiator location, wherein the initial information is collected between a predefined start point and a predefined stop point, wherein the inspection resource processes the one of the messages at the initiator location while simultaneously collecting the initial information, wherein the query indicator is set by firmware included in hardware that is located at the initiator location, wherein the supplemental information that is collected at the receiver location includes durations and/or counts, wherein the initial information that is collected at the initiator location includes a duration that the inspection resource took to process the one of the messages.

19. The computer program product of claim 16, wherein sending the one of the messages with the set query indicator to the receiver location includes using a peripheral component interconnect express (PCIe) function field to actually transfer the one of the messages with the set query indicator, wherein the inspection resource processes the one of the messages at the initiator location while simultaneously collecting the initial information.

20. The computer-implemented method of claim 8, wherein the query indicator is set by firmware included in hardware that is located at the initiator location, wherein the inspection resource processes the message at the receiver location while simultaneously collecting the supplemental information, wherein the supplemental information that is collected at the receiver location includes durations and/or counts, wherein the received initial information is not sent to the initiator location, wherein the supplemental information is collected between a predefined start point and a predefined stop point, wherein the initial information includes a duration that an inspection resource at the initiator location took to process the message, wherein the supplemental information includes a duration that the inspection resource at the receiver location took to process the message, wherein receiving the message and the collected initial information includes receiving a peripheral component interconnect express (PCIe) function field which actually transfers the message and the collected initial information.

* * * * *